United States Patent [19]

Werner

[11] Patent Number: 4,488,417

[45] Date of Patent: Dec. 18, 1984

[54] ANTI-THEFT DEVICES FOR PARKED TRACTOR VEHICLES

[76] Inventor: Clarence L. Werner, 11806 Adams Plz., Omaha, Nebr. 68137

[21] Appl. No.: 448,597

[22] Filed: Dec. 10, 1982

[51] Int. Cl.$^3$ .............................................. E05B 65/12
[52] U.S. Cl. .......................................... 70/253; 70/14; 70/259
[58] Field of Search .................. 70/253, 14, 252, 237, 70/255, 259, 18–19

[56] References Cited

U.S. PATENT DOCUMENTS

| | | | |
|---|---|---|---|
| 1,333,878 | 3/1920 | Smith | 70/253 |
| 1,377,124 | 5/1921 | Godbey | 70/253 |
| 1,426,534 | 8/1922 | Baker | 70/253 |
| 1,520,600 | 12/1924 | Robbins | 70/253 |
| 1,557,713 | 10/1925 | Logan | 70/253 |

Primary Examiner—Robert L. Wolfe

Attorney, Agent, or Firm—George R. Nimmer

[57] ABSTRACT

Whenever a tractor vehicle of the cab-over-engine type is being parked in a wheels-turned condition, the steering column pitman-arm typically resides in temporary horizontal registry with a foot-hold opening of the tractor frontal bumper. For such environment, an anti-theft device comprises three main components including: a J-hook extendable through the foot-hold opening and engageable with the pitman-arm; a vertical abutment-plate surrounding the J-hook longer leg and abutting the bumper while obscuring the foot-hold opening; and a padlock having its shackle passing through the J-hook longer leg frontally of the abutment-plate. These three main components, and including steadying means for the combination, result in the J-hook being drawn tightly forwardly against the pitman-arm toward the bumper whereby attempted thievery is frustrated because the steering is thereby inoperative.

9 Claims, 6 Drawing Figures

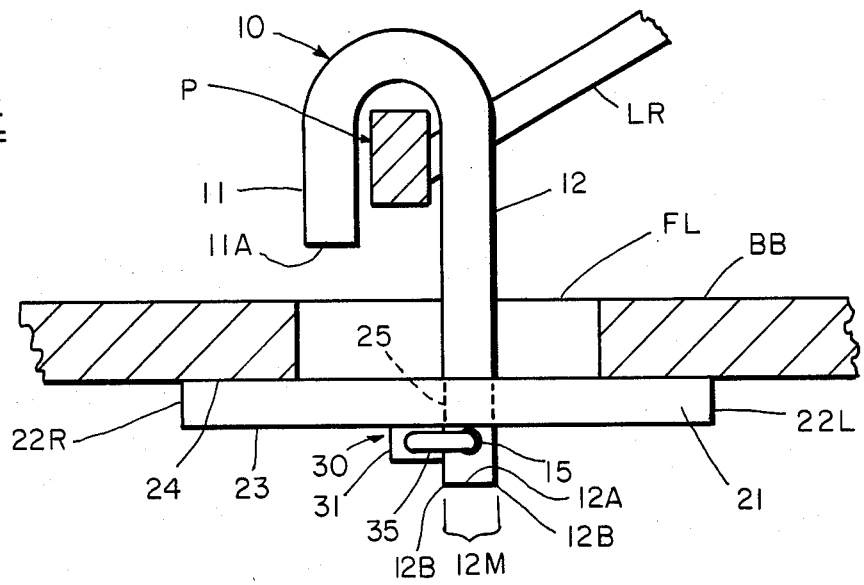
FIG. 4
FIG. 3
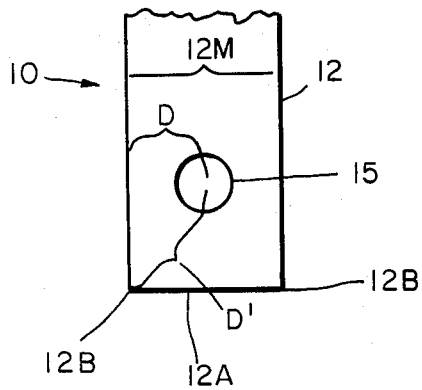
FIG. 5

ANTI-THEFT DEVICES FOR PARKED TRACTOR VEHICLES

Tractor vehicles are quite vulnerable to being driven away by unauthorized persons whenever the tractor is left in unattended parked condition, such as when the authorized driver sojourns at a truckstop cafe, a highway comfort station, etc. Though numerous anti-theft devices are available for protecting the tractor doors and ignition, no one anti-theft device is adequate by itself to prevent thievery by one unencumbered by time constraints. Thus, anti-theft devices in addition to the locked cab door and ignition should be employed. And since precious time is required to successfully negotiate each anti-theft device, hopefully the authorized driver will return to his parked vehicle before the thief has had sufficient time to breach the entire arsenal of anti-theft devices employed.

It is accordingly the general objective of the present invention to provide an exceedingly effective and reliable addition to the arsenal of anti-theft devices which might be employed to protect a parked tractor vehicle from attempted thievery.

It is an ancillary general objective to provide an anti-theft device which includes an element of surprise tending to restrict the thief to the locus of the crime, and thereby increasing the chance that he can be apprehended.

With the above and other objects and advantages in view, which will become more apparent as this description proceeds, the anti-theft devices of the present invention require the driver to park his cab-over-engine type tractor in a wheels-turned condition whereby the steering column pitman-arm is brought into a horizontal register with a foothold opening of the tractor frontal bumper. The anti-theft device comprises for its three main components: a J-hook extendable through the bumper foot-hold opening, a vertical abutment-plate for surrounding the longer leg of the J-hook and for wholly abuttably obscuring the foot-hold opening, and a padlock having its shackle passing through the J-hook longer leg frontally of the abutment-plate. In this manner, and together with steadying means, the J-hook is drawn tightly forwardly against the steering column pitman-arm. Thus, even if a would-be thief has already successfully breached the locked cab door and ignition, he will find himself unable to manipulate the steering wheel whereby his "getaway" will be restricted to circular travel keeping him at the scene of the crime.

In the drawing, wherein like characters refer to like parts in the several views, and in which:

FIG. 3 is a frontal elevational view of the anti-theft device embodiment of FIG. 2 shown installed at the tractor frontal bumper;

FIG. 4 is a sectional plan view taken along line 4—4 of FIG. 3;

FIG. 5 is a top plan view of the forward terminal end of the J-hook component longer leg.

Figure 1:
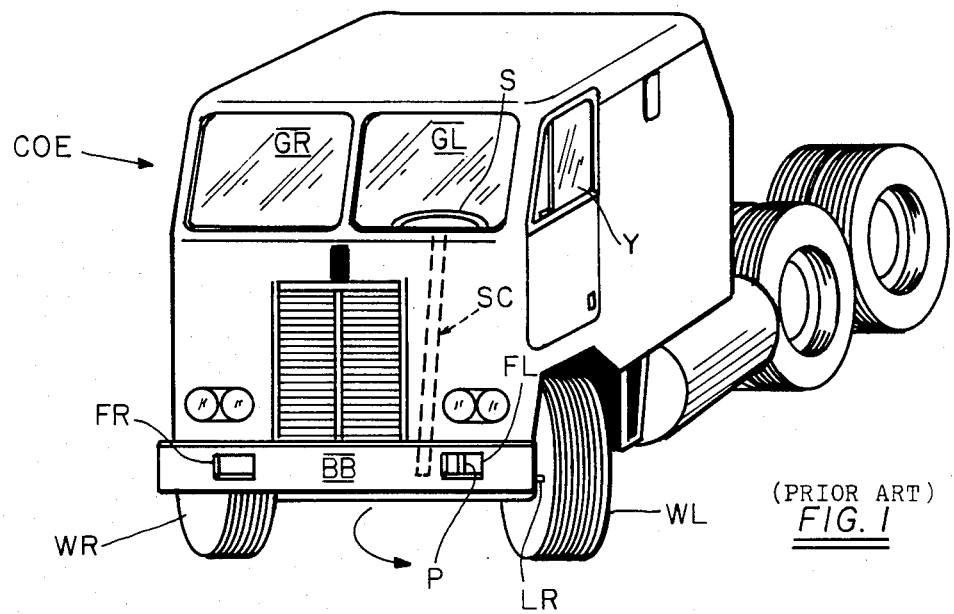
FIG. 1 is a perspective view of a typical cab-over-engine tractor vehicle shown in a wheels-turned parked condition thereby bringing the steering column pitman-arm into horizontal registry with the driverside foot-hold opening of the frontal bumper.

Turning initially to FIG. 1 which depicts a cab-over-engine tractor vehicle "COE" as the environment for the anti-theft device (e.g. "ATD"), of the present invention. Tractor "COE" is shown with driverside cab entry door "Y", frontal bumper "BB" having off-center foot-hold openings "FR" and "FL" to permit servicing of cab windows "GR" and "GL", steering wheel "S" for steering column "SC" that has a co-turnable and radially-offset pitman-arm "P", and steering linkage "LR" connecting pitman-arm "P" to driverside frontal wheel "WL". Utilizing steering wheel "S", tractor "COE" is necessarily parked in a wheels-turned condition as is depicted by the illustrated attitude for frontal wheels "WL" and "WR" and by the curved directional arrow. With such wheels-turned condition toward the driverside, pitman-arm "P" will typically become in horizontally aligned condition with driverside opening "FL" and therethrough accessible for ready engagement by the J-hook component (e.g. 10). To ensure such horizontal alignability for the pitman-arm "P", it is conceiveable that the bumper foot-hold opening "FL" might have to be enlarged to permit engagement of the J-hook.

Figure 2:
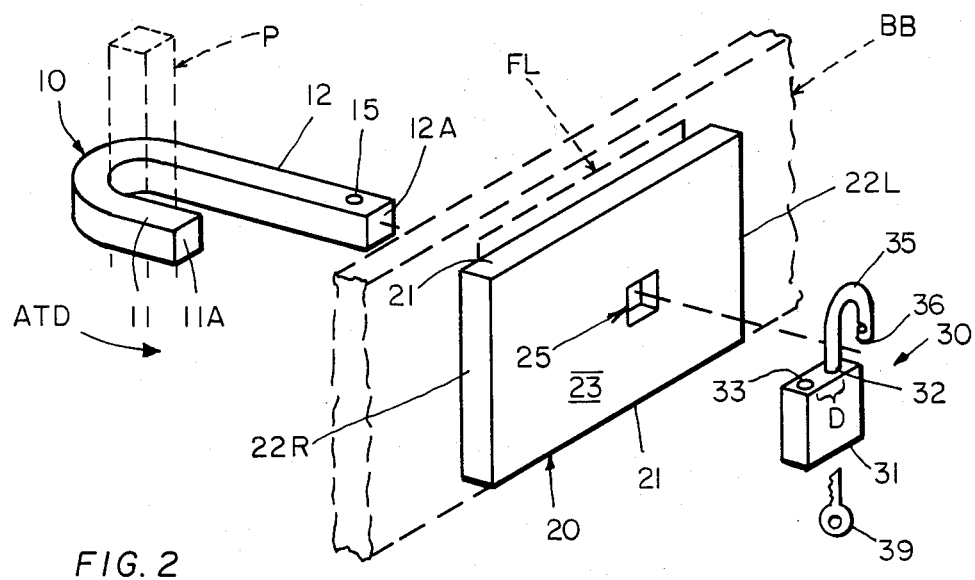
FIG. 2 is an exploded perspective view of a representative embodiment of the anti-theft devices of the present invention. Essential parts of the tractor environment are indicated in phantom lines.

The three main components for anti-theft embodiment "ATD", and their relationship to the tractor essential parts, are depicted in the FIG. 2 exploded view. Specifically, the three main components include: a J-hook 10 extendable through driverside foot-hold opening "FL" and engageable with horizontally aligned pitman-arm "P" located a few inches behind bumper "BB"; a vertical abutment-plate 20 apertured (25) for surrounding J-hook longer leg 12 and for abutting the bumper frontal side and wholly obscuring opening "FL"; and a padlock 30 having its shackle 35 passing through a J-hook hole (e.g. 15) located frontally of abutment-plate 20. As will be explained later in greater detail, there are steadying means to ensure that the J-hook will be drawn tightly forwardly against the pitman-arm "P" with reference to the bumper-abutting abutment-plate 20.

FIGS. 3 and 4 illustrate anti-theft embodiment "ATD" in a condition installed by the tractor operator immediately prior to his temporary departure from his wheels-turned parked tractor. As previously mentioned, so long as the anti-theft device remains installed, in firm engagement with the pitman-arm "P", a would-be thief cannot manipulate steering wheel "S" thereby maintaining the unauthorized driver to a circular pathway that confines him to the scene of the crime.

Considering FIGS. 3 and 4, horizontal J-hook 10 is engaged with pitman-arm "P" located behind bumper opening "FL" whereby J-hook shorter leg 11 terminates (11A) behind abutment-plate 20 and bumper "BB". J-hook longer leg 12 has its terminus 12A located frontally of abutment-plate 20 and bumper "BB". The non-circular terminal portion of longer leg 12, and frontally of abutment-plate 20, includes a hole therethrough e.g. 15, which is preferably vertical as shown (though a horizontal hole might be used). Vertical abutment-plate 20 might take a rectangular shape including horizontal edges 21, vertical edges 22L and 22R, front surface 23, and rear surface 24 abuttable against bumper "BB". Abutment-plate 20 is provided with a non-circular aperture (e.g. 25) to permit horizontal passage therethrough of J-hook non-circular leg 11, the aperture being preferably located nearer to edge 22L than to edge 22R. Non-rotability of abutment-plate 20, to ensure the obscured condition for opening "FL", is afforded by the non-circular e.g. rectangular, longer leg 12 and aperture 25. In this regard, the respective aperture dimensions 25M and 25N are preferably substantially equal to the longer leg cross-sectional dimensions 12M and 12N.

Padlock 30 is of the conventional key-operated (39) type comprising a body 31 having openings 32 and 33 for a U-shaped shackle 35 having finite-breadth "D" and a free-end 36 engageable at padlock body opening 33.

Figure 6:
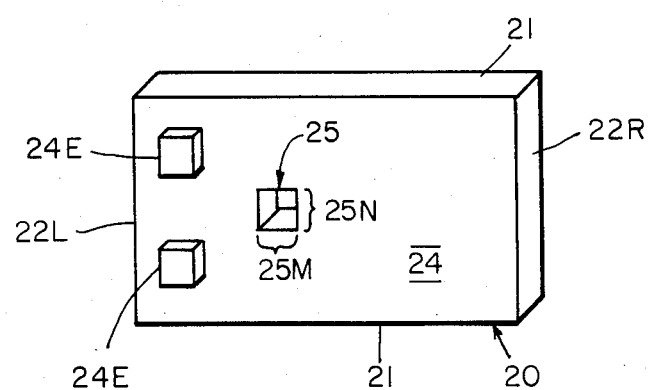
FIG. 6 is a rearward elevational view of the abutment-plate component, showing the optional inclusion of rearwardly extending lugs to provide one type of steadying means.

The aforealluded to steadying means comprises at least one, and preferably combinations, of the following conditions:

(a) substantially equal dimensions for 25M and 12M, and for 25N and 12N, (b) as seen in FIG. 6, abutment-plate rearwardly extending lugs 24E abuttable within corners of foot-hold opening "FL", (c) hole 15 of longer leg 12 being located immediately forwardly of abutment-plate 20 whereby padlock shackle 35 abuts the frontal surface 23 of abutment-plate 20, (d) as seen in FIG. 5, a vertical hole 15 being located substantially distance "D" from the side of leg 12 and distance "D'" from leg right-angle corners 12B. Regarding the last mentioned condition, the corners 12B at terminus 12A for J-hook longer leg 12 tend to prevent the shackle (35) from being manipulated for exposure to a theft-abetting cutting tool.

From the foregoing, the construction and operation of the anti-theft devices will be readily understood and further explanation is believed to be unnecessary. However, since numerous modifications and changes will readily occur to those skilled in the art, it is not desired to limit the invention to the exact constructions shown and described, and accordingly, further modifications and equivalents may be resorted to, as encompassed by the scope of the appended claims.

What is claimed is as follows:

1. In combination with a cab-over-engine type tractor vehicle wherein its vertical steering column carries a co-turnable and radially-offset pitman-arm that is pivotally connected to linkage to effect steering of the tractor through driverside roadway wheel, and wherein the tractor has an upright frontal bumper frontally disposed of the pitman-arm and having a driverside foot-hold opening in horizontal registry with the pitman-arm whenever the steering wheel is turned in the direction of the driverside roadway wheel, the improvement of a tractor anti-theft device for a tractor parked in the condition where the steering wheel has brought the pitman-arm in horizontal registry with said bumper foot-hold opening, and said anti-theft device thereat comprising:

A a horizontally extending J-hook extending through the driverside foot-hold opening and engaged with the pitman-arm, said J-hook adjacent the free-end terminus of the longer leg being provided with a hole therethrough;

B a vertical abutment-plate having frontal and rear upright surfaces and being provided with a horizontal aperture therethrough, said abutment-plate rear surface abutting against the bumper and so as to wholly obscure the driverside foot-hold opening, the J-hook longer leg protruding through the abutment-plate aperture whereby the J-hook longer leg hole is located frontally of the abutment-plate, the J-hook shorter leg being located wholly rearwardly of the abutment-plate;

C padlock means having a shackle of finite-breadth and said shackle extending through the J-hook longer leg; and D steadying means to maintain the J-hook drawn tightly forwardly against the pitman-arm and at the abutment plate in non-rotational and obscuring relationship at the bumper driverside foot-hold opening.

2. The anti-theft combination of claim 1 wherein the J-hook is generally uniplanar; and wherein the J-hook longer leg terminus is non-circular and slidably received by a non-circular aperture for the abutment-plate.

3. The anti-theft combination of claim 1 wherein the steadying means comprises having the J-hook hole positioned very close to the abutment-plate whereby the padlock shackle is in substantial contact with the abutment-plate.

4. The combination of claim 3 wherein the J-hook hole is vertical; and wherein the abutment-plate is substantially rectangular having two upright edges including a left-edge and a right-edge, the aperture being non-circular and located nearer to the left-edge than to the right-edge.

5. The anti-theft combination of claim 1 wherein the J-hook longer leg is non-circular and slidably received by a geometrically similar non-circular aperture for the abutment-plate; and wherein the J-hook free-end terminus has two right-angle corners, the distance from the J-hook hole to a right-angle corner exceeding the shackle finite-breadth.

6. The combination of claim 5 wherein the J-hook hole is vertical and positioned very close to the abutment-plate.

7. The anti-theft combination of claim 1 wherein the abutment-plate is substantially rectangular having two upright edges including a left-edge and a right-edge, the aperture being non-circular and being located nearer to the left-edge than to the right-edge whereby the J-hook shorter leg is located nearer to the right-edge than to the left-edge.

8. The anti-theft combination of claim 1 wherein the steadying means comprises a plurality of lugs attached to the abutment-plate and extending rearwardly therefrom for engaging within the driverside foot-hold opening.

9. The combination of claim 8 wherein the J-hook is generally uniplanar; and wherein the J-hook longer leg is polygonal and slidably received by a geometrically similar polygonal aperture for the abutment-plate.

* * * * *